United States Patent [19]

Hansen

[11] 4,249,464

[45] Feb. 10, 1981

[54] MICROWAVE MEAL RACK

[76] Inventor: Larry J. Hansen, 1733 S. Fawcett, Tacoma, Wash. 98402

[21] Appl. No.: 10,760

[22] Filed: Feb. 9, 1979

[51] Int. Cl.³ .............................................. A47J 37/06

[52] U.S. Cl. ...................................... 99/450; D7/129; 99/DIG. 14; 108/156; 219/10.55 E

[58] Field of Search ............................... D7/129, 130; 99/DIG. 14, 450, 451; 108/156, 901; 126/390, 337 R, 337 A, 333; 248/188; 219/10.55 E; 206/326

[56] References Cited

U.S. PATENT DOCUMENTS

| | | | |
|---|---|---|---|
| D. 243,649 | 3/1977 | Carbary | D7/129 |
| D. 251,106 | 2/1979 | Petursson | D7/129 |
| D. 251,107 | 2/1979 | Ottier | D7/130 |
| 2,328,503 | 8/1943 | Schmitt | 206/326 |
| 2,997,566 | 8/1961 | Pierce | 219/10.47 |
| 3,651,796 | 3/1972 | Nelson | 99/450 |
| 3,687,092 | 8/1972 | Manning | 108/156 |
| 3,941,968 | 3/1976 | MacMaster | D7/130 |
| 3,946,187 | 3/1976 | MacMaster | 99/DIG. 14 |
| 4,080,524 | 3/1978 | Greenfield | 219/10.55 E |
| 4,121,510 | 10/1978 | Frederick | 219/10.55 E |

FOREIGN PATENT DOCUMENTS

| | | | |
|---|---|---|---|
| 150869 | 11/1931 | Switzerland | 99/450 |

*Primary Examiner*—Billy J. Wilhite

*Attorney, Agent, or Firm*—Kenneth S. Kessler

[57] ABSTRACT

A meal rack is constructed in order to double the usable oven space in a microwave oven. The meal rack has a grid frame with open space allowing for the dissipation of moisture. The legs used to elevate the meal rack frame are easily engaged and disengaged.

1 Claim, 3 Drawing Figures

MICROWAVE MEAL RACK

SUMMARY OF THE INVENTION

A meal rack frame is elevated by disengagable meal rack legs. The meal rack legs keep the meal rack frame horizontal to the floor of a microwave oven.

The meal rack frame is made up of a series of grid frame bars which outline a rectangular grid with corresponding open spaces between the grid frame bars thereby allowing for escape of moisture.

Affixed to the meal rack frame on the side of the meal rack frame upon which utensils will lie is ribbing. The ribbing achieves the function of lessening the contact between the utensil and the meal rack frame itself. The lessening of contact between the utenisl and the meal rack frame, correspondingly lessens the heat transfer between the utensil and the meal rack.

Since the legs are easily engaged and disengaged, various sets of lengths of legs may be positioned within sockets in the meal rack frame, thereby allowing the meal rack frame to stand at various elevations depending on the size of the item which the user wishes to cook within the microwave oven.

BACKGROUND OF THE INVENTION

The use of microwave ovens for cooking is increasing due to the speed in which various foods can be cooked and due to the minimum amount of energy expended in cooking. However, utensils used in conjunction with a microwave oven have special requirements and problems. The meal rack of the present invention meets and solves a number of these special requirements and problems.

A first requirement is that the utensil be made of material which does not reflect or absorb microwave energy. If the utensil does reflect or absorb microwave energy the product being cooked will not be cooked efficiently.

A problem confronting persons cooking with microwave ovens is the uneven distribution of microwave energy throughout the oven itself. In most microwave ovens, the highest level of energy is experienced in the middle of the microwave oven while less energy is experienced at the microwave oven floor. The meal rack disclosed allows the user to take advantage of this disparity of energy. Thus, those foods requiring the most cooking are placed on the meal rack while those foods requiring less or more gentle cooking are placed on the floor of the microwave.

The most obvious advantage of the meal rack is the added cooking capacity the meal rack gives to the microwave oven. Thus, the usable space in which foods or dishes may be placed is doubled. Additionally, as outlined above, the meal rack not only doubles the capacity of the oven but gives the user various options as to cooking intensity for various foods. For this reason, a food needing a greater amount of microwave energy may be cooked at the same time as a food needing less energy.

A further problem of cooking with microwave ovens is preventing moisture to collect on the bottom of a pan or on the floor of the microwave oven. The present invention solves this problem by establishing a grid for support but allowing large areas of open space for the dissipation of moisture from products such as pizza that may be placed upon the meal rack.

DETAILED DESCRIPTION OF THE DRAWINGS

The meal rack 10 is made of material compatible with cooking in microwave ovens.

Figure 1:
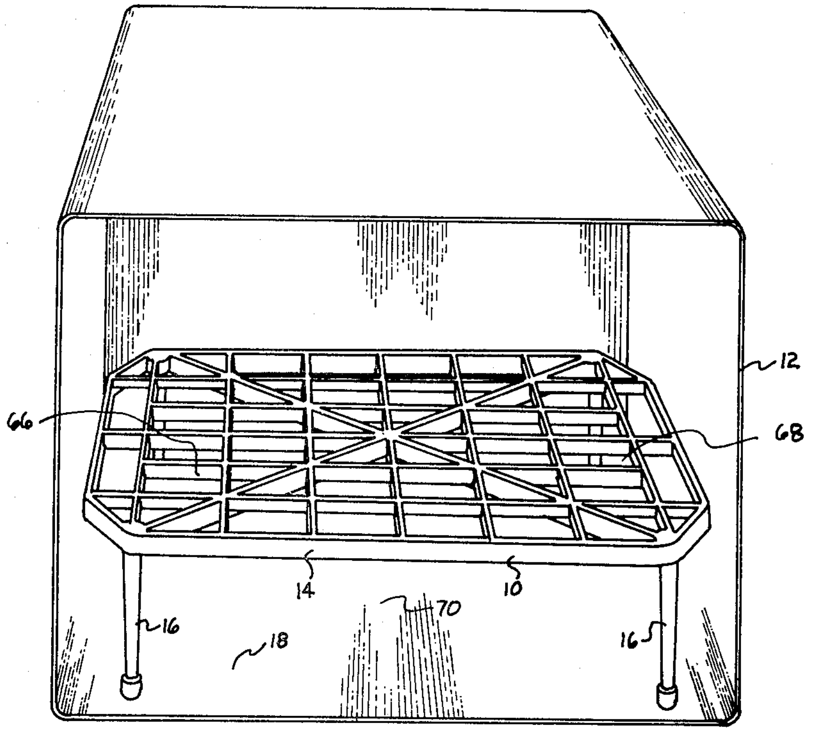
FIG. 1 is a perspective view of the meal rack positioned within a microwave oven.

FIG. 1 illustrates the meal rack set up within the oven 12.

The meal rack 10 has a meal rack frame 14 supported by meal rack legs 16. The meal rack legs 16 elevate the meal rack frame to a position above the floor 18 of the microwave oven.

Figure 2:
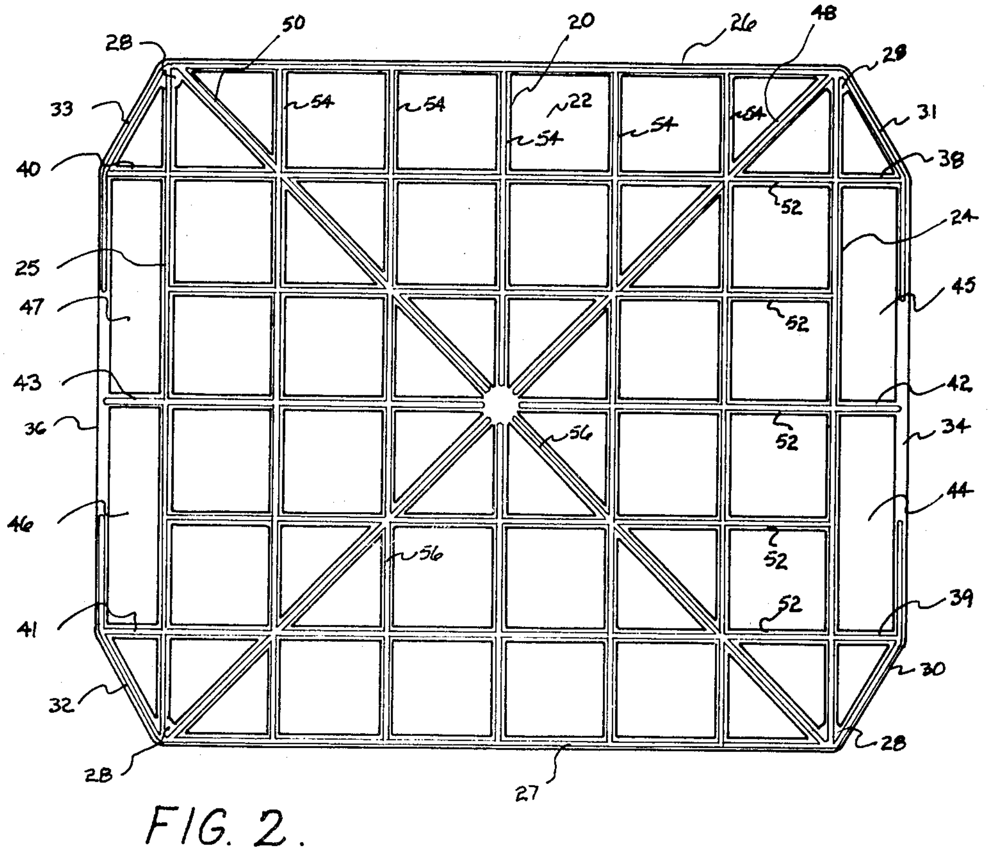
FIG. 2 is an overhead view of the meal rack.
Figure 3:
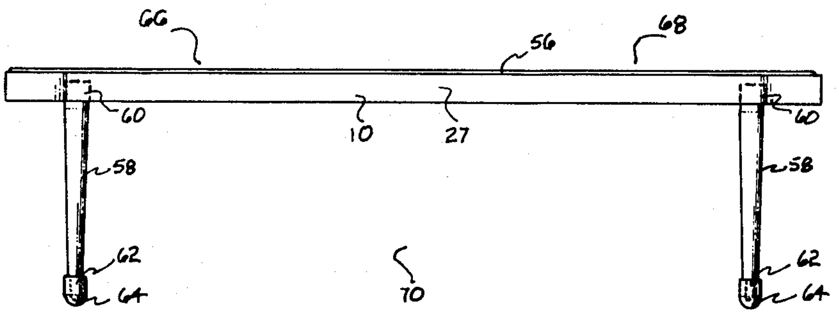
FIG. 3 is a side view of the meal rack.

An overhead view of the meal rack frame 14 is illustrated in FIG. 2. The meal rack frame 14 has a support grid 20 thereby allowing for open spaces 22 interspaced within the support grid 20. Open spaces 22 are effective in the dissipation of moisture. To illustrate, the cooking of pizza is taken as an example.

If a pizza is laid on the floor of the microwave oven 18, moisture will condense at the bottom of the pizza dough thereby leaving the pizza soggy. This condensation will also occur if the pizza is laid on a pan. However, when a pizza is positioned on the grid 20 of the meal rack frame 14 moisture can escape from the bottom of the pizza through open spaces 22 thus uniformly cooking the pizza.

The meal rack frame 14 is formed by frame sides 24 and 25 and frame sides 26 and 27. The frame sides 24, 25, 26 and 27 form a rectangular configuration. Positioned at each corner where the frame sides 24, 25, 26 and 27 meet are leg receiving sockets 28.

Extending from frame sides 24 and 25 are angled extension frame sides 30, 31, 32 and 33. Secured to angled extension frame sides 30 and 31 is extension frame side 34. The extension frame side 34 is parallel to frame side 24. Secured to angled extension frame sides 32 and 33 is extension frame side 36 which is parallel to frame side 25.

Affixed between frame side 24 and extension frame side 34 are grid frame extension bars 38 and 39. The grid frame extension bars 38 and 39 are at right angles to the frame side 24 and extension frame side 34, and meet at the junction of the angled extension frame sides 30 and 31 with the extension frame side 34.

Similarly, affixed between frame side 25 and extension frame side 36 are grid frame extension bars 40 and 41. The grid frame extension bars 40 and 41 are at right angles to the frame side 25 and extension frame side 36, and meet at the junction of the angled extension frame sides 32 and 33 with the extension frame side 36.

Midway between grid frame extension bars 38 and 39 and also midway between grid frame extension bars 40 and 41 are grid frame extension bars 42 and 43 respectively. The grid frame extension bars 42 and 43 are parallel to the grid frame extension bars 38, 39, 40 and 41. The grid frame extension bars thus form rectangular extension open spaces 44, 45, 46 and 47. When the meal rack is manufactured, it is advantageous for the manufacturer to be able to detachably secure the meal rack legs 16 to the meal rack frame 14. In the preferred embodiment, the four meal rack legs 16 may be so secured to the grid frame extension bars 42, 43 and housed within the rectangular extension open spaces 44, 45, 46 and 47. To give the meal rack frame 14 strength, diagonal frame bars 48 and 50 are secured to the leg receiving sockets 28. The weight of the frame will, of course, be experienced at the sockets 28 and the diagonal frame bars 48 and 50 will aid and assist in the caring of this weight.

Affixed between frame sides 24 and 25 are grid frame bars 52. In the preferred embodiment there are five grid frame bars all running parallel to each other.

Affixed at right angles to frame sides 26 and 27 are grid frame bars 54. In the preferred embodiment, there are five grid frame bars 54 running parallel to each other.

Affixed to the meal receiving sides of the meal rack frame 14 is ribbing 56. The ribbing 56 is effective in preventing the transfer of heat from a cooking utensil to the meal rack frame itself. Thus, if a utensil is set directly on a flat meal rack frame surface, more heat would be transferred from the utensil to the meal rack frame. However, with the ribbing, the amount of direct contact with the meal rack frame 14 is lessened, and correspondingly, heat transfer is lessened.

The meal rack legs 16 in the preferred embodiment have a tapering body 58 extending from the cylindrical leg insertion 60. The cylindrical leg insertion is constructed to easily engage and disengage from the leg receiving socket 28. Extending from the tapered leg body 58 are leg end projections 62. The leg end projections are designed to be capable of resting secure on the floor of the microwave oven 18 and are also capable of receiving leg end tips 64 which are made of microwave compatible material which give the meal rack legs 16 a better gripping surface. In the preferred embodiment, the length of the meal rack legs 16 will bring the meal rack frame to approximately the middle of the microwave oven 12. However, the length of the meal rack legs 16 may vary, in fact, the manufacturer may give purchasers several sets of various lengths legs in order that the purchasers can determine different effective elevations for cooking.

Microwave ovens have uneven distributions of microwave energy throughout the oven. In FIG. 1, three separate positions 66, 68, and 70 are illustrated. In the majority of microwave ovens, the highest level of energy is experienced at positions 66 and 68. Thus, those foods that need more cooking energy than similar foods being cooked at the same time are placed in positions 66 and 68 rather than in position 70. However, this does give the user the opportunity of positioning different dishes in the microwave oven at the same time. Further, due to the introduction in many microwave ovens of the microwave energy at a given angle many microwave ovens experience a higher level of microwave energy at one side of the microwave oven than the energy experienced at the other side. We arbitrarily assume that position 66 has a more higher energy level than position 68. Thus, the sides positioning higher capacity at positions 66 and 68 versus the lower position 70, the user may position food between position 66 and 68 giving the user another variable.

Although a particular preferred embodiment of the invention has been disclosed above for illustrative purposes it will be understood that variations or modifications thereof which lie within the scope of the appended claims are contemplated.

I claim:

1. A meal rack cooking utensil for supporting food in a microwave oven, comprising:

a frame fabricated from a material that is suitable for use in a microwave oven;

said frame having two spaced-apart parallel sides and two-additional spaced-apart parallel-sides connected at right angles to said first-mentioned parallel sides to define a rectangular frame;

a first series of spaced-apart parallel support bars that are parallel to said first-mentioned sides, some of said support bars extending outwardly of said second-mentioned sides on opposite sides of said frame;

a second series of spaced-apart parallel support bars that are parallel to said second-mentioned sides so that said first and second support bars define an open rectangular lattice work therebetween;

two diagonally aligned support bars extending between opposite corners of said frame;

extension frame side members connected between said ends of said outwardly extending first-mentioned support bars, and angled side extension members extending between said extension frame side members and the ends of said first-mentioned sides;

leg receiving sockets formed at the intersection of said first and second-mentioned side members; and a leg detachably insertable within each socket to position said frame in a horizontal plane above a floor of a microwave oven;

said sides and bars having an upwardly facing surface with a raised rib formation on said upwardly facing surfaces.

* * * * *